2,748,702

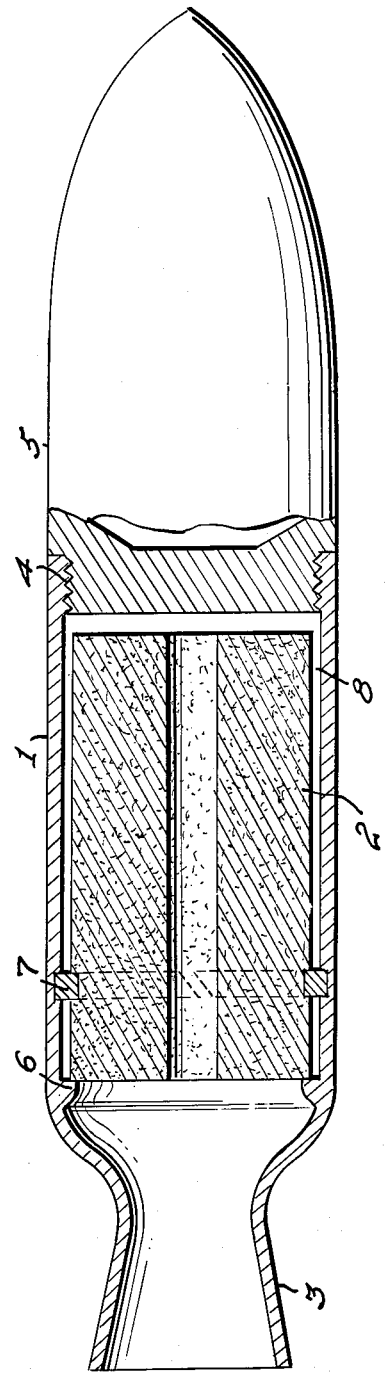

ROCKET

Winslow A. Sawyer, East Braintree, Mass., assignor to the United States of America as represented by the Secretary of the Army Application July 2, 1952, Serial No. 296,791

3 Claims. (Cl. 102—49)

This invention relates to combustion apparatus particularly designed for use in vehicles having the rocket type of propulsion. In these vehicles combustion gases in large volume are continuously discharged at a high velocity from a rearwardly open nozzle and the gases are usually produced by the combustion of a propellent grain at a high temperature.

It is necessary that the propellent grain be seated against the rear grain spacer to prevent damage thereto particularly from the pressure differential between the front and rear faces of the grain during ignition and the early part of burning. The differential expansion in response to temperature change of the propellent grain and motor over the expected ambient temperature range requires a physical clearance between the grain and the motor housing to permit physical dimension changes.

It is accordingly an object of my invention to provide a novel positioning structure for a rocket propellent grain.

It is a further object of my invention to improve on the propellent grain supports now in use.

Other objects and advantages will be apparent from the following description in which the single figure shows a longitudinal elevation of a rocket combustion chamber showing the manner of mounting the propellent grain.

The invention essentially comprises mounting a propellent grain in the longitudinal axis of a chamber with a divided snap ring very near the rear end of the grain. A hollow cylindrical motor 1 is provided to house the propellent grain 2. The motor terminates in an outwardly flaring nozzle 3 of conventional Venturi construction. The other end of the motor is provided with threads 4 on the interior surface thereof to receive the threaded end of a projectile head 5. The head contains the pay load (not shown) and may consist of a high explosive, a chemical grenade or any suitable material. Propellent grain 2 comprises a single column of powder and extends to the rear support flange 6. A split snap ring 7 held in a circular kerf in the motor wall and in a mating groove in the propellent allows the part of the propellent between the bottom of head 5 and the ring 7 to float in an air gap 8 provided between the outside diameter of the propellent and the inner surface of the motor. The organization is very easily assembled by encircling the propellent with the split snap ring and forcing the assemblage into the motor body. It has been found that the propellent is elastic enough to permit a limited compression thereof during travel of the ring within the body and then to urge the ring outward and into its kerf if it is desired to use a ring that is not split for compression.

It has been further found that the propellent grain changes length by 0.464" more than the steel motor case over the expected temperature range of operation of —60° F. to 165° F. The snap ring assembly shown herein permits grain length variation without imparting dangerous stresses thereto.

It can be readily seen that I have provided a combustion chamber structure that permits grain length variations without imparting stresses thereto and that can be quickly and cheaply assembled.

Having thus described my invention and the advantages thereof I do not wish to be limited to the details herein disclosed otherwise than as set forth in the claims, but what I claim is:

1. In a rocket projectile having a combustion chamber, a propellent grain in said chamber disposed in concentric relation therewith, and a split ring embracing said propellent grain near one end thereof and seated in a groove in the wall of said chamber to maintain the other end of said grain in spaced relation with the said combustion chamber in all dimensions.

2. In a rocket projectile having a combustion chamber, a propellent grain in said chamber disposed in concentric relation therewith, an integral flange formed in said chamber to receive one end of said propellent grain, and a split ring embracing said grain adjacent said one end thereof and seated in a groove in the wall of said chamber to maintain the other end of said grain in spaced relation with the said combustion chamber in all dimensions.

3. A rocket projectile having a propulsion powder chamber, said chamber comprising a cylinder closed at one end thereof and terminating in a Venturi-like nozzle at the other end, an integral flange in said chamber adjacent said nozzle, a propellent grain in said chamber disposed in concentric spaced relation therewith, and means cooperating with said chamber and said grain to maintain said spaced relation, said means comprising a split ring embracing said propellent grain near one end thereof and seated in a kerf in the internal wall of said chamber, the said grain bearing against the said flange at the said one end whereby the other end beyond the said split ring is spaced from the chamber surface in all dimensions.

References Cited in the file of this patent

UNITED STATES PATENTS

| 797,218 | Dupont | Aug. 15, 1905 |
| 2,419,866 | Wilson | Apr. 29, 1947 |
| 2,503,270 | Hickman | Apr. 11, 1950 |

FOREIGN PATENTS

| 1,012,420 | France | Apr. 16, 1952 |